(12) United States Patent
Liao

(10) Patent No.: US 6,346,665 B1
(45) Date of Patent: Feb. 12, 2002

(54) DUAL ADJUSTING HOLDER FOR DRUM

(76) Inventor: Tsun-Chi Liao, No. 14, Chun-Kung Rd., Pei-Tun Dist., Taichung City (TW)

(*) Notice: Subject to any disclaimer, the term of this patent is extended or adjusted under 35 U.S.C. 154(b) by 0 days.

(21) Appl. No.: 09/679,821

(22) Filed: Oct. 5, 2000

(51) Int. Cl.[7] .............................................. G10D 13/02
(52) U.S. Cl. ........................ 84/421; 84/327; 84/411 R
(58) Field of Search ...................... 84/421, 327, 411 R; 248/421, 218.4, 229.13

(56) References Cited

U.S. PATENT DOCUMENTS

| | | | | |
|---|---|---|---|---|
| 892,105 A | * | 6/1908 | White | 248/60 |
| 5,973,248 A | * | 10/1999 | Chen | 84/421 |
| 6,015,128 A | * | 1/2000 | Lombardi | 248/421 |

* cited by examiner

Primary Examiner—Shih-Yung Hsieh
(74) Attorney, Agent, or Firm—Bacon & Thomas, PLLC

(57) ABSTRACT

A dual adjusting holder includes two sets of adjusting holder engaged with a support mounted on a bass drum for holding percussion instruments. Each adjusting holder includes a first clamp and a second clamp to hold and grip a ball member. The first clamp has a first holding space, a rectangular through opening at one end and a first lug at another end. The second clamp has a second holding space, a round through opening at one end and two second lugs at another end pivotally engageable with the first lug. A fastening bolt is provided to engage the rectangular and round through opening for adjusting gripping force on the ball member such that the ball member may be turned to an angle desired. There is a sleeve attached to one side of the second clamp. The sleeve includes a stationary clamp arm and a movable clamp arm for engaging with the support at a position desired through a fastening screw. The ball member holds a strut for supporting the percussion instruments. By means of adjusting the fastening bolt and fastening screw, the adjusting holder may be secured easily and quickly at a position and angle desired.

5 Claims, 6 Drawing Sheets

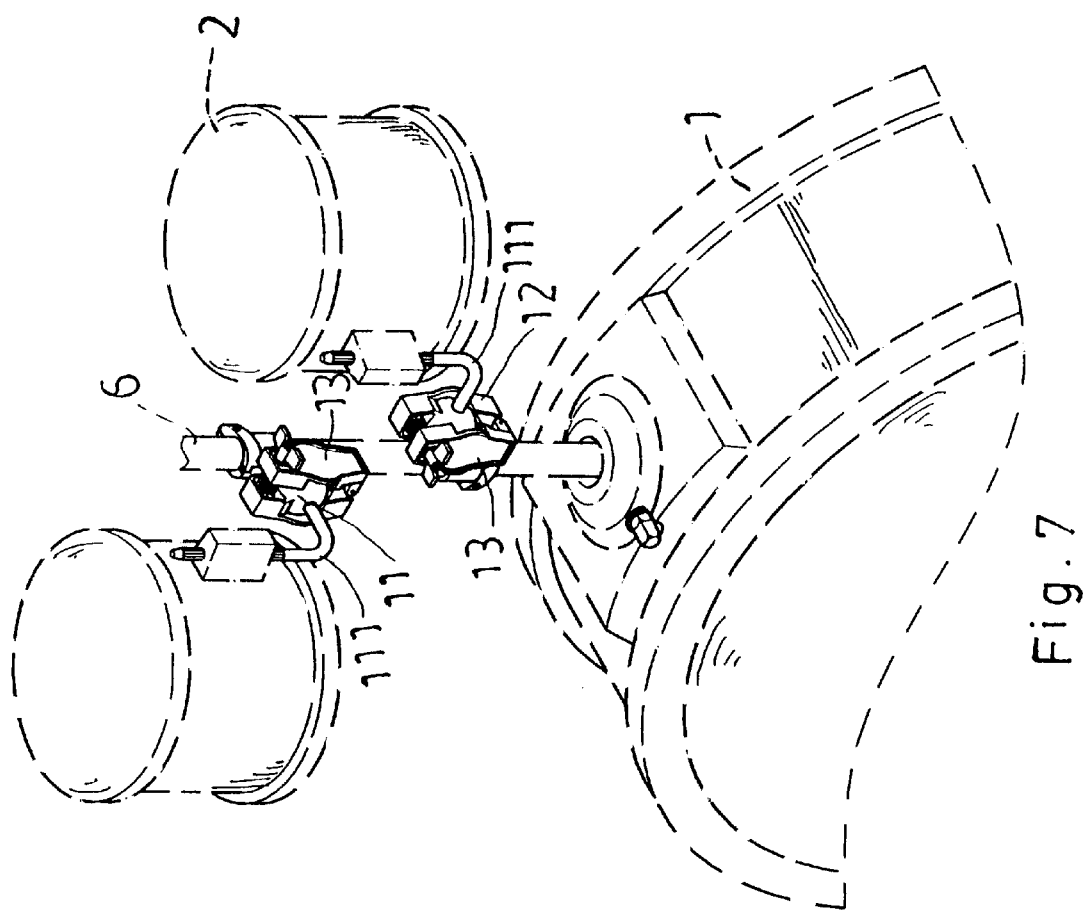

DUAL ADJUSTING HOLDER FOR DRUM

BACKGROUND OF THE INVENTION

This invention relates to peripheral apparatus for drum set and particularly to an adjusting holder that may change positions and angle rapidly.

FIG. 1 and 2 show a conventional bass drum and aerial tom-toms used in jazz bands. It has a tom-tom holder to support the tom-toms above the base drum. The tom-tom holder includes a base fixedly mounted on a side wall of the base drum adjacent the counterhoop, a protrusive block located above the base having two cavities formed therein and two struts extended upward from the cavities. Each strut has a top end attached with an angle adjusting means which has one end fastened to the side wall of the tom-tom.

Because of the constraints of adjusting angle of the adjusting means, the tom-tom holder usually can hold only two sets of tom-tom. It is not adequate to meet performance requirements when more drums and tom-toms are needed. Furthermore, the base is fixedly mounted on the bass drum and offers no dynamic displacement adjusting function. The only adjustment may be made is to change the angle of the tom-tom in a limited range. There is no way to move the tom-tom forward and rearward, or upward and downward to suit different height and arm length of the drummers. There is still room for improvement.

SUMMARY OF THE INVENTION

It is an object of this invention to provide an adjusting holder that may be moved upward and downward, and forward and rearward to adjust displacement and position so that the percussion instruments held thereon may be deployed at positions and angles desired to facilitate arrangement with other musical instruments, and may be assembled and disassembled easily.

In order to achieve aforesaid object, the adjusting holder according to this invention includes a first clamp and a second clamp. The first clamp has a first holding space, a rectangular through opening at one end and a first lug at another end. The second clamp has a second holding space, a round through opening at one end, two second lugs at another end thereof for pivotally engaging with the first lug, and a sleeve located at a side wall thereof including a stationary clamp arm and a movable clamp arm.

BRIEF DESCRIPTION OF THE DRAWINGS

The invention, as well as its many advantages, may be further understood by the following detailed description and drawings, in which:

FIG. 7 is a pictorial view of this invention in use.

DETAILED DESCRIPTION OF THE PREFERRED EMBODIMENT

Figure 1:
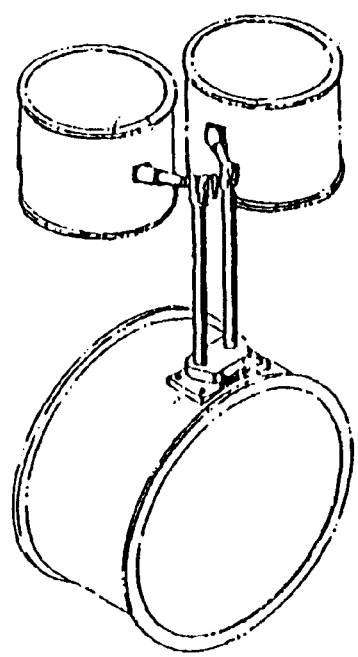
FIG. 1 is a pictorial view of a conventional drum set.
Figure 2:
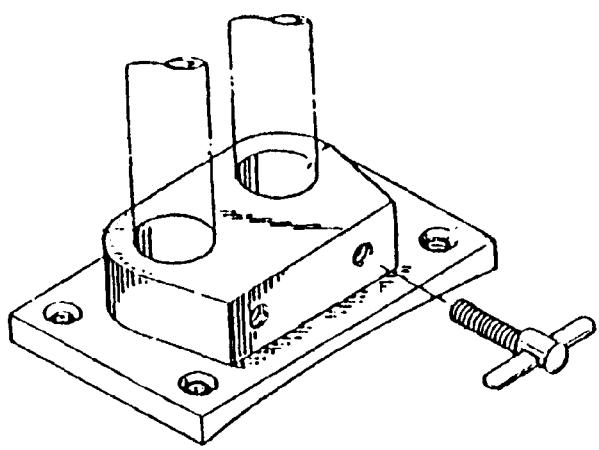
FIG. 2 is a perspective view of an adjusting base for a conventional drum set.

Referring to FIG. 3 through 7, this invention aims at providing two sets of adjusting holder 10 fastened to a support 6 mounted on a bass drum 1 for holding percussion instruments such as tom-tom 2 or cymbals (not show) thereon. The adjusting holder 10 grips a ball member 11, which has a strut 111 extending outward for supporting the tom-tom 2, or cymbal (not show).

The adjusting holder 10 includes a first clamp 12, a second clamp 13 and a spring 15. The first clamp 12 has a first holding space 121 for holding the ball member 11. The first holding space 121 has a first concave inside surface which has a plurality of bulged ridges 122 formed thereon for holding the ball member 11 securely. The first clamp 12 further has a rectangular through opening 123 at one end for receiving a fastening bolt 124 and a first lug 125 at another end thereof.

The second clamp 13 has a second holding space 131 for holding the ball member 11. The second holding space 131 has a second concave inside surface which has a plurality of annular step rings formed thereon for holding the ball member 11 of different sizes. The second clamp 13 further has a round through opening 132 at one end for receiving the fastening bolt 124 and two second lugs 133 for pivotally engaging with the first lug 125. Hence the first clamp 12 and second clamp 13 may be turned about the engaged first lug 125 and second lugs 133 for opening or closing by means of the fastening bolt 124. Furthermore there is a sleeve 14 attached to one side of the second clamp 13. The sleeve 14 has a stationary clamp arm 141 at one side pivotally engaged with a movable clamp arm 142 at another side thereof through a third lug 144 and a fourth lug 145 located respectively at one end of the clamp arm 141 and 142. The clamp arm 141 and 142 have respectively another end which may be engaged by means of a fastening screw 146. By means of the fastening screw 146, the clamp arm 141 and 142 may be loosened for holding the support 6 therein and moving the adjusting holder 10 along the support 6 at a position desired, then fastened tightly to position the adjusting holder 10 on the support 6 securely. The spring 15 is located between the first clamp 12 and second clamp 13.

When this invention is in use for adjusting the angle of the strut 111, the fastening bolt 124 should be turned to loosen the engagement between the first clamp 12 and second clamp 13. The compress spring 15 will push the first clamp 12 and second clamp 13 apart from each other to speed up the loosening process. The gripping force on the ball member 11 resulting from the clamps 12 and 13 will be released. The ball member 11 may be turned to an angle desired. Then the fastening bolt 124 may be turned and tightened to move the first clamp 12 close to the second clamp 13 for gripping the ball member 11 tightly. The bulged ridges 122 in the first holding space 121 and annular step rings in the second holding space 131 may provide more gripping force for holding the ball member 11 securely.

For moving the adjusting holder 10 upward or downward to a different height, the fastening screw 146 should be turned loose to make the movable clamp arm 142 turning about the engaged third lug 144 and fourth lug 145, and moving away from the stationary clamp arm 141. The gripping of the adjusting holder 10 on the support 6 will be loosened. Then the adjusting holder 10 may be moved up or down to a height desired. Afterward, the fastening screw 146 may be turned to move the movable clamp arm 142 close to the stationary clamp arm 141 to grip the support 6 tightly for the adjusting holder 10 be mounted on the support 6 firmly.

Figure 3:
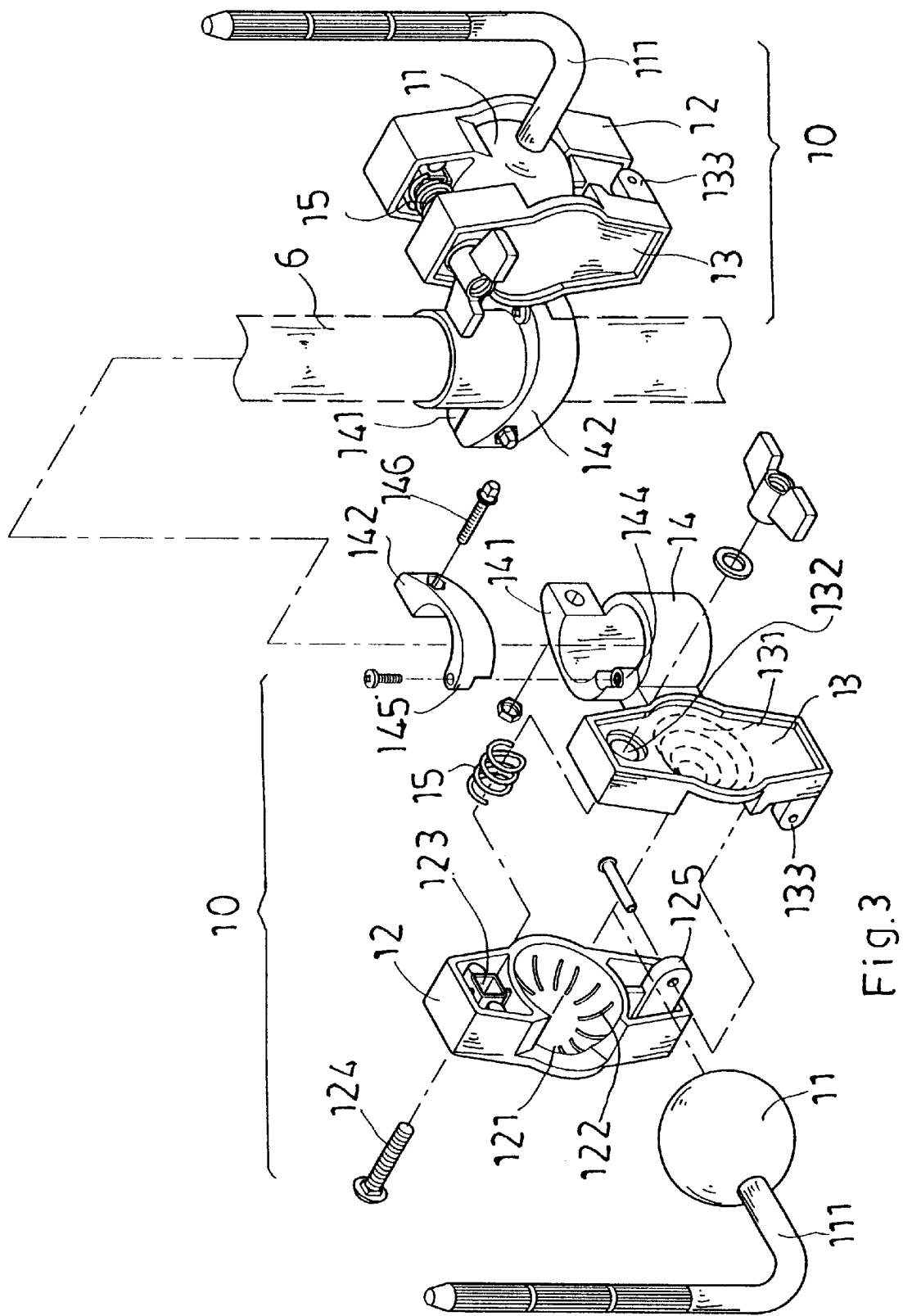
FIG. 3 is an exploded view of this invention.
Figure 4:
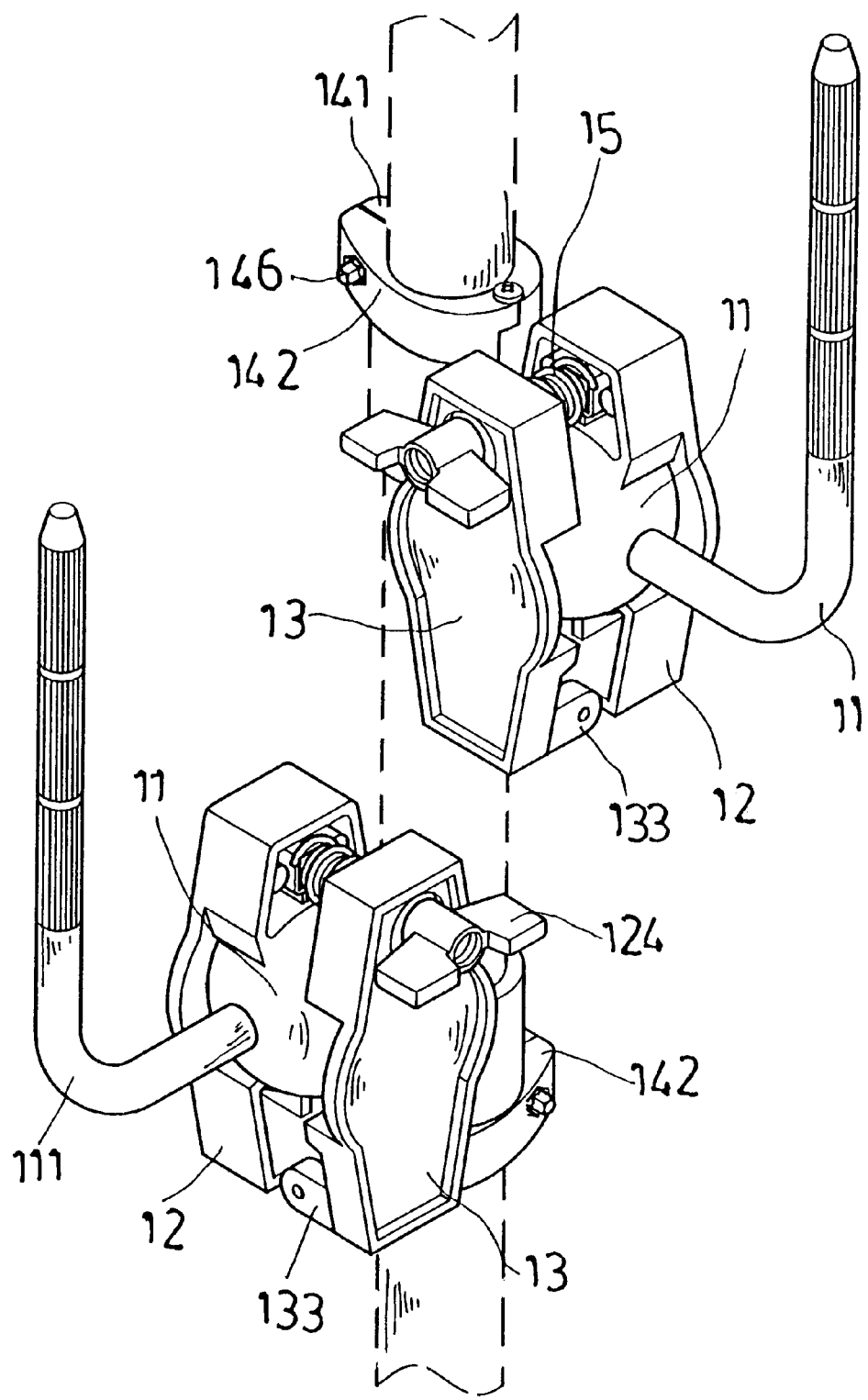
FIG. 4 is a perspective view of this invention.
Figure 5:
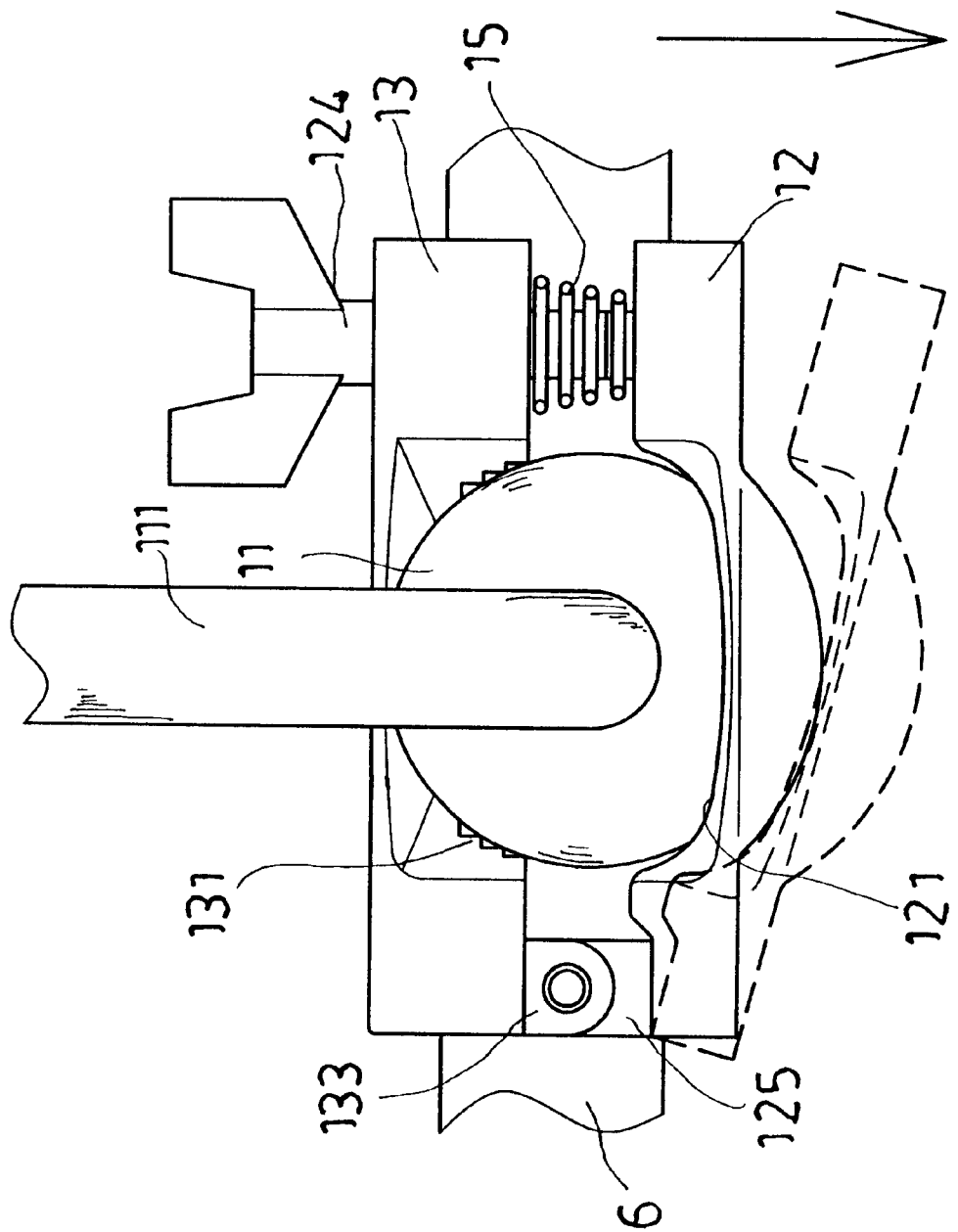
FIG. 5 is a top view of the clamps of this invention in use.
Figure 6:
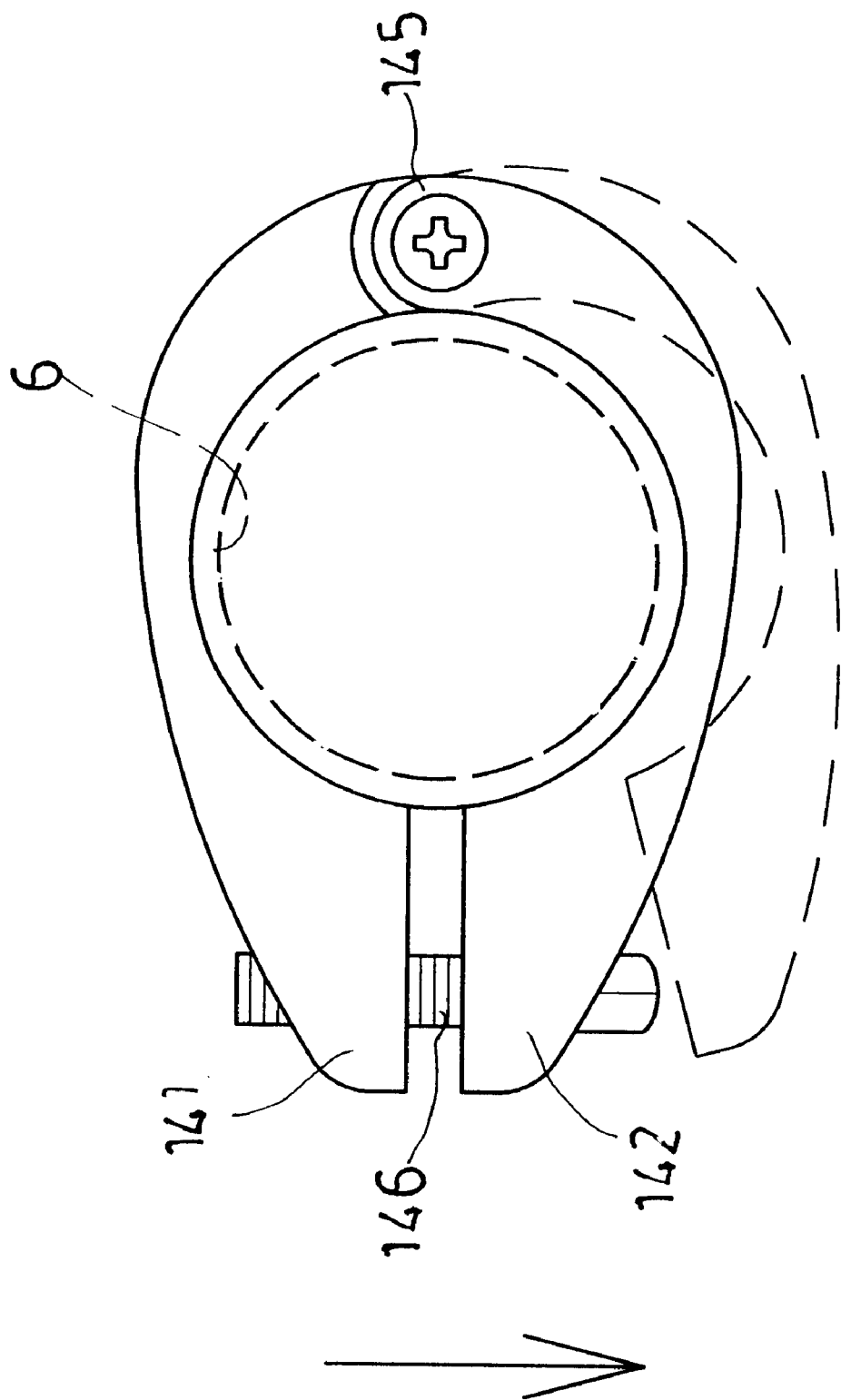
FIG. 6 is a top view of the clamp arms of this invention in use.

As shown in FIGS. 3, 4 and 7, the two sets of the adjusting holders 10, 10 are each independently movable up and down along the support 6, one on top of the other, such that the respective ball members 11, 11 of each of the two sets of the adjusting holders 10, 10 will be at different heights along the support.

It may thus be seen that through loosening or tightening the fastening bolt 124 and fastening screw 146, the ball member 11 and adjusting holder 10 may be moved to a selected position and angle easily.

What is claimed is:

1. A dual adjusting holder for a drum having two sets of adjusting holders fastened to a support for holding percussion instruments thereon, each of the adjusting holders holding a ball member which engages with a strut for supporting the percussion instruments, each of the adjusting holders comprising:

a first clamp including a first holding space located inside the first clamp for holding the ball member, a rectangular through opening located at one end thereof for receiving a fastening bolt and a first lug located at another end thereof; and a second clamp including a second holding space located inside the second clamp for holding the ball member, a round through opening located at one end thereof for receiving the fastening bolt, two second lugs located at another end thereof pivotally engageable with the first lug, and a sleeve attached to a lateral side of the second clamp, the sleeve having a stationary clamp arm located at one side thereof and a movable clamp arm located at another side thereof; the stationary clamp arm and the movable clamp arm being pivotally engaged through a third lug and a fourth lug located respectively at one end thereof and fastenable at another end thereof through a fastening screw; and wherein each of the two sets of the adjusting holders is independently movable up and down along the support, one on top of the other, such that the respective ball members of each of the two sets of the adjusting holders will be at different heights along the support.

2. The dual adjusting holder for drum according to claim 1, wherein the first holding space has a first concave inside surface which has a plurality of bulged ridges formed thereon, the second holding space has a second concave inside surface which has a plurality of annular step rings formed thereon for gripping the ball member of different sizes with the first concave inside surface.

3. The dual adjusting holder for drum according to claim 1 further having a spring located between the first and second clamps.

4. A dual adjusting holders for a drum having two sets of adjusting holders fastened to a support on the drum for holding percussion instruments thereon, each of the adjusting holders being capable of independently moving on said support and holding a ball member which engages with a strut for supporting the percussion instruments, each of the adjusting holders comprising:

a first clamp including a first holding space located inside the first clamp for holding the ball member, a rectangular through opening located at one end thereof for receiving a fastening bolt and a first lug located at another end thereof; and a second clamp including a second holding space located inside the second clamp for holding the ball member, a round through opening located at one end thereof for receiving the fastening bolt, two second lugs located at another end thereof pivotally engageable with the first lug, and a sleeve attached to a lateral side of the second clamp, the sleeve having a stationary clamp arm located at one side thereof and a movable clamp arm located at another side thereof; the stationary clamp arm and the movable clamp arm being pivotally engaged through a third lug and a fourth lug located respectively at one end thereof and fastenable at another end thereof through a fastening screw; and wherein each of the two sets of the adjusting holders is independently movable up and down along the support, one on top of the other, such that the respective ball members of each of the two sets of the adjusting holders will be at different heights along the support.

5. The dual adjusting holder for drum according to claim 4, wherein the first holding space has a first concave inside surface which has a plurality of bulged ridges formed thereon, the second holding space has a second concave inside surface which has a plurality of annular step rings formed thereon for gripping the ball member of different size with the first concave inside surface.

* * * * *